US006904569B1

(12) United States Patent
Anderson (10) Patent No.: US 6,904,569 B1
(45) Date of Patent: Jun. 7, 2005

(54) LINK-LEVEL BROWSER INSTANCE CONTROL

(75) Inventor: Glen J. Anderson, Sioux City, IA (US)

(73) Assignee: Gateway, Inc., Irvine, CA (US)

( * ) Notice: Subject to any disclaimer, the term of this patent is extended or adjusted under 35 U.S.C. 154(b) by 660 days.

(21) Appl. No.: 09/917,390

(22) Filed: Jul. 26, 2001

(51) Int. Cl.[7] .................................................. G09G 5/00
(52) U.S. Cl. ........................ 715/851; 715/760; 715/835; 715/845
(58) Field of Search ................................ 345/851, 760, 345/835, 845

(56) References Cited

U.S. PATENT DOCUMENTS

| | | | |
|---|---|---|---|
| 5,790,122 A | | 8/1998 | Cecchini et al. |
| 5,802,530 A | | 9/1998 | Van Hoff |
| 5,838,906 A | | 11/1998 | Doyle et al. |
| 5,872,974 A | | 2/1999 | Mezick |
| 5,893,064 A | * | 4/1999 | Kudirka et al. .......... 704/270.1 |
| 6,025,844 A | * | 2/2000 | Parsons ...................... 345/805 |
| 6,065,059 A | | 5/2000 | Shieh et al. |
| 6,683,633 B2 | * | 1/2004 | Holtzblatt et al. .......... 345/854 |

FOREIGN PATENT DOCUMENTS

JP        11-328224        11/1999

OTHER PUBLICATIONS

US 5,884,318, 3/1999, Nielsen et al. (withdrawn)
Jon Bosak, et al., "XML and the Second–Generation Web", May 1999, Scientific American Feature Article, http://www.sciam.com/1999/0599issue/0599bosak.html.
"XML Linking Language (XLink) Version 1.0", W3C, Dec. 20, 2000, http://www.w3org.TR/xlink.

Walter S. Mossberg, "A Browser Road Map: Shortcuts for Trips on the World Wide Web", Wall Street Journal, No. 171, p. B1 (W) and p. B1 (E), Aug. 27, 1998.

* cited by examiner

Primary Examiner—John Cabeca
Assistant Examiner—Michael Roswell
(74) Attorney, Agent, or Firm—Jeffrey A. Proehl; Ross Hunt, Jr.; Stites & Harbison PLLC (57) ABSTRACT

A method for processing data contains links to information in a data browsing system, thereby providing user control over link activation behavior. As data is received, it is parsed to identify a link. Link-option data is then generated and inserted into the received data, such that a user may retrieve the information identified by the link in response to selection of the link-option data independent of retrieving the information in response to selection of the link. For example, the link-option data may be capable of retrieving the information for display in a current presentation instance, in a separate presentation instance overlaid upon the current presentation instance, in a separate presentation instance side-by-side with the current presentation instance, or in a separate presentation instance with minimization of the current presentation instance.

17 Claims, 7 Drawing Sheets

LINK-LEVEL BROWSER INSTANCE CONTROL

FIELD OF THE INVENTION

This invention relates generally to the field of data browsing and, more particularly, to systems and methods for improving user control of the data browsing experience in computer implemented data browsing systems.

BACKGROUND OF THE INVENTION

Data browsing is a common form of information review. While conducting research in one text, an individual may come across a reference to another text, article or other source of information, which appears pertinent to the task at hand. The individual then retrieves the referenced text to review, while saving his place in the original text. While reviewing the referenced text, the individual can then repeat the process or return to the original text. In the traditional world of physical books and libraries, this data browsing process is labor intensive and time consuming.

With the development of computer networks and linked electronic data, data browsing has become simpler, faster and more effective. Linked data includes additional information that references a location of another data file or data object. By selecting a particular piece of linked data, such as by pointing to it with a cursor and pressing a button, a user of a data browsing system causes the referenced data file or data object to be retrieved and presented to the user. While the concept of linked data is applicable to many types of data retrieval systems, the most common application today is on the Internet and the World Wide Web.

The Internet is a computer network made up of nodes spanning the entire globe. A node can be a multi-purpose computer, a computer network, or any machine capable of communicating using Internet Protocol, such as routers, bridges and dumb terminals. Host computers or networks of computers on the Internet allow easy access to electronic services and information. Hosts can be sponsored by a wide range of entities including, for example, universities, government organizations, commercial enterprises and individuals.

Internet information and services are made available to the public through servers running on Internet hosts. Although a server is, strictly speaking, the software that resides on a host, an Internet host is also commonly referred to as a server because it performs this function. An individual using a computer connected to the Internet can access a very large amount of information by running client software, such as web browsing software, which requests data from the large number of servers connected to the Internet.

The World Wide Web is based on the combination of a standardized hypertext script language for defining the semantic value of data, such as Hypertext Markup Language ("HTML") or a particular breed of Extensible Markup Language ("XML"), and a hypertext transfer protocol, such as "HTTP". HTTP is designed to run primarily over the Transport Control Protocol (TCP), which is one of many transport layer protocols designed for use with the Internet Protocol (IP). HTTP uses the standard Internet setup, where a server issues the data and a client displays or processes the data using a web browser. This data can be in many forms including text, pictures, sound and software. Because the Web uses hypertext (information that defines the semantic value of data with which it is associated), it is very easy to create linked data on the Web. For example, using HTML, a link is typically created using the "href" attribute of the "a" element to identify a resource, using a Uniform Resource Identifier ("URI"), or a Uniform Resource Locator ("URL"), which is a particular type of URI. When such links are associated with text, or some other grouping of data, a user simply selects the text to cause the resource to be retrieved.

Through the use of these links, the Web provides ready access to information on the Internet, allowing a user to navigate Internet resources intuitively, using a graphical user interface, without specific knowledge of IP addresses and other specialized information. The Web comprises millions of data files, frequently referred to as "web pages", connected by links. These web pages can be downloaded and displayed on a user's computer. Hosts running web servers provide these web pages.

Web server software is relatively simple and available on a wide range of computer platforms, including standard personal computers. Equally available is web browser software, which is used to request and display web pages and other types of data files to users. Thus, the combination of the Internet, the World Wide Web, and web browsers has created the largest and most comprehensive data browsing system known to date.

Figure 2:
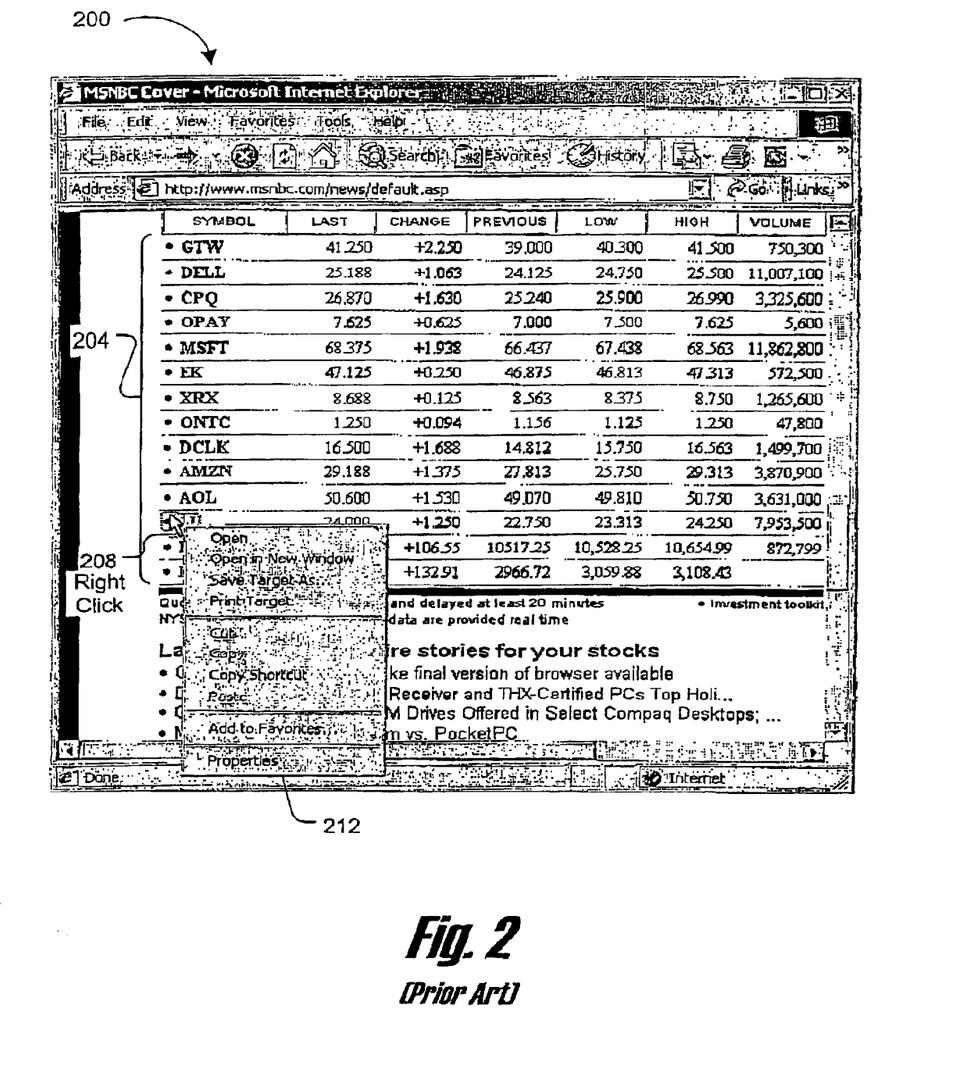
FIG. 2 is an illustration depicting an exemplary user interface for data browsing using a prior art link activation control mechanism.

FIG. 2 is an illustration depicting an exemplary user interface for data browsing using a prior art link activation control mechanism. Referring now to FIG. 2, a graphical user interface (GUI) presentation 200 is a window created by (or instance of) data browsing software, such as Microsoft Internet Explorer available from Microsoft Corporation in Redmond, Wash. The GUI presentation 200 is displaying a web page designated by the URL "http://www.msnbc.com/news/default.asp."

This web page shows various stock symbols 204 and their pricing and trading information. Each stock symbol 204 is also a link to more detailed information regarding the stock. By left clicking on a stock symbol link 204, a user will cause the web browser to request the more detailed information and display it in the GUI presentation 200. If the user wishes to keep this instance of the web browser displaying the current page and retrieve the more detailed information about a particular stock in a new instance of the web browser, the user must first right click 208 a selected link.

When the user right clicks 208 a selected link, an options menu 212 appears on the display. Included within this options menu 212 is an "Open in New Window" option. The user then moves the cursor down to this option and left clicks it to open the selected link in a new instance of the web browser. Thus, in order to open a link in a new web browser instance, the user must take four separate actions: (1) move the cursor to the link, (2) right click the link (3) move the cursor to the option, and (4) left click the option.

Moreover, the new instance of the web browser is opened on top of the current instance. If the user wishes to compare detailed information side by side, as is common in data browsing and particularly so in the case of looking up stock information, the user must then manually resize the two instances of the web browser.

When the extra user actions required by the current data browsing technology are considered in the aggregate over many hundreds of hours of data browsing activity, they represent a significant amount of wasted time and energy.

In addition, when people browse the World Wide Web, they are often subjected to unpredictable behavior of links, as programmed by the author of a particular web site. For example, a user may click on one link that opens a web page in a separate instance of the browser, while another link may open a page within the same instance of the browser. Links that spawn new instances of a browser unexpectedly can be very frustrating for a user, especially when the user is on a system with limited resources for managing windows.

In conventional data browsing systems, the user typically has no way to know how a link will behave until after it is selected, and the user has no ability to specify a manner in which to retrieve data identified by a link without extraneous user actions. Thus, what is needed is a system and method to improve user control of the data browsing experience, thereby enabling more efficient data browsing.

SUMMARY OF THE INVENTION

The present invention is directed to a method for processing data containing links to information in a data browsing system, whereby user control over link activation behavior is enabled. The method includes the steps of receiving the data, parsing the data to identify the link, generating link-option data, and inserting the link-option data into the received data before presenting the received data to a user. The link-option data is capable of retrieving the information in response to selection of the link-option data independent of retrieving the information in response to selection of the link. For example, the link-option data may be capable of retrieving the information for display in a current presentation instance, in a separate presentation instance overlaid upon the current presentation instance, in a separate presentation instance side-by-side with the current presentation instance, or in a separate presentation instance with minimization of the current presentation instance. Additionally, the link-option data may be capable of retrieving the information for editing in an editor program or for storage on a data storage device, as well as of sending the link itself to another user.

The present invention is also directed to a system which implements a method for processing data containing links to information, whereby user control over link activation behavior is enabled. In one embodiment, the system is a data browsing apparatus connected to a network, such as a multipurpose computer connected to the Internet and running a web browser. In another embodiment, the system is a service provider, such as an Internet Service Provider, coupling a data browsing apparatus with a network such as the Internet. In yet another embodiment, the system is a central server, such as a web server, accessible by a data browsing apparatus via a network such as the Internet.

DETAILED DESCRIPTION OF THE INVENTION

The present invention is directed toward link activation control in a data browsing apparatus and data browsing systems. The present invention is disclosed and described herein in terms of a data browsing apparatus utilizing the Internet and the World Wide Web. Description in these terms is provided for ease of discussion only. After reading this description, it will become apparent to one of ordinary skill in the art how to implement the invention in alternative embodiments and alternative network environments. For example, alternative embodiments include a multi-purpose computer running a web browser, and a dumb terminal running library database browsing software. In addition, the present invention will also be useful in applications that interact with data browsing systems. For example, in non-web applications that open web pages, the present invention could be used to provide user control over how a web page is launched from the non-web application.

Alternative network environments include any "Future Net" which will likely encompass the functions now provided by today's Internet, cable and broadcast television, telephone communications and other linear and interactive business and telecommunications systems, and any collection of electronic devices connected by communication means so as to allow data retrieval and review. As such, the description of this example embodiment should not be construed to limit the scope and breadth of the present invention.

Moreover, it is understood that the World Wide Web is just one part of the Internet, and is only one type of data browsing system to which the present invention is applicable. However, because the World Wide Web is widely used, the discussion that follows below will use terms referring to the Internet and the World Wide Web, without intending to limit the discussion to the specific terms that are used.

Figure 1A:
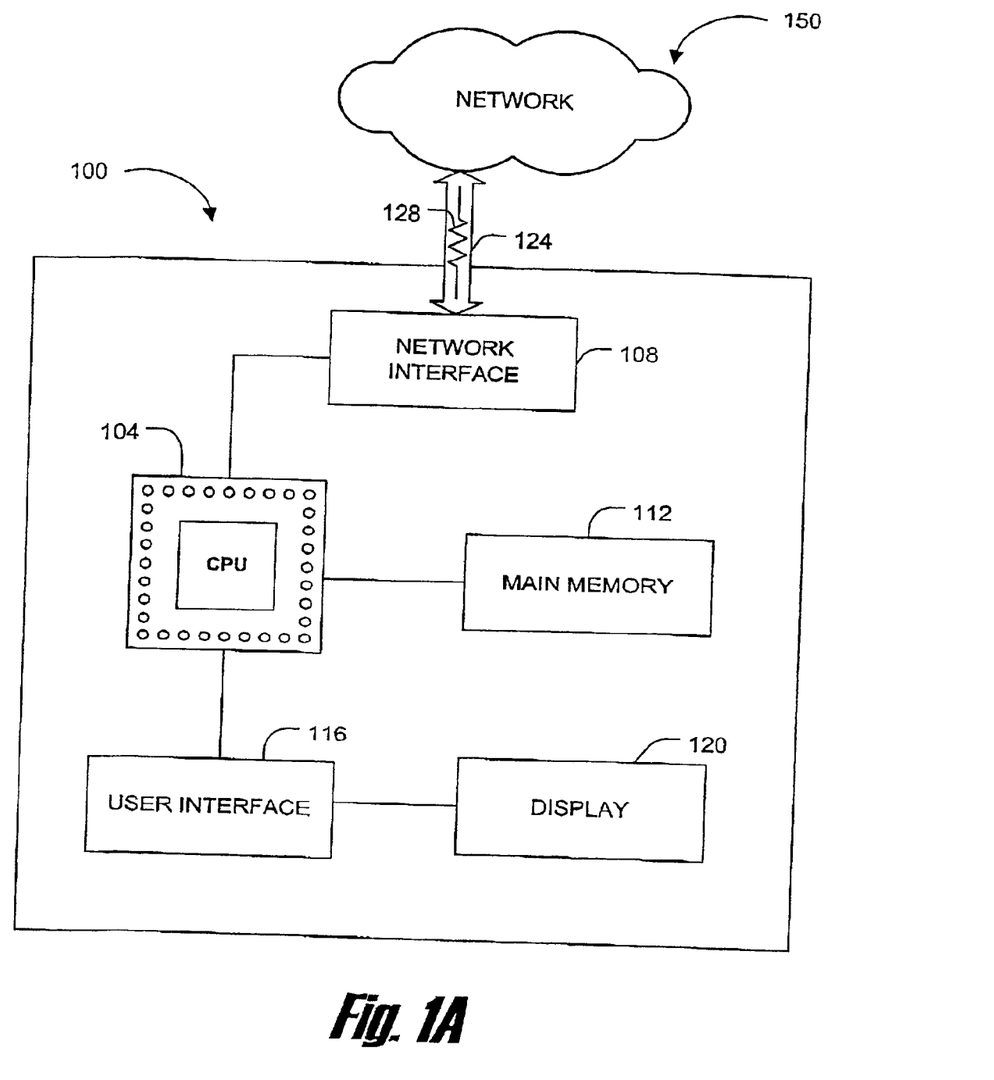
FIG. 1A is a block diagram depicting an exemplary data browsing apparatus connected with its operational environment according to one embodiment of the present invention.

FIG. 1A is a block diagram depicting an exemplary data browsing apparatus connected with its operational environment according to one embodiment of the present invention. Referring now to FIG. 1A, a data browsing apparatus 100 is connected to a network 150, which in this example embodiment is the Internet, via a channel 124. This channel 124 carries signals 128 and can be implemented using wire or cable, fiber optics, a phone line, a cellular phone link, a radio frequency (RF) link, infrared interface (IR) or other communications channels. The signals 128 are data files requested by the data browsing apparatus 100, as well as communication protocol information used in obtaining the data files via the network 150.

The data browsing apparatus 100 includes a central processor ("CPU") 104, a network interface 108, a main memory 112, a user interface 116 and a display 120. The network interface 108 provides a connection between the data browsing apparatus 100 and the network 150. The network interface 108 receives the signals 128, thereby providing the CPU 104 with access to data and code in a manner that is well-known and commonly used in computer systems. In this example embodiment, the network interface 108 includes control logic allowing requesting and receiving of data files via the network 150 and downloading of the user interface 116 upon power up of the data browsing apparatus 100.

The main memory 112 provides CPU 104 with access to storage for data and code, including the user interface 116, in a manner that is well-known and commonly used in computer systems. The user interface 116 represents an operating system for the data browsing apparatus 100, and allows a user to request data files via links presented on the display 120.

In one embodiment, the present invention is implemented by the user interface 116 within the data browsing apparatus 100. In an alternative embodiment, the present invention is implemented by the network interface 108 within the data browsing apparatus 100. While the above embodiments describe a dumb terminal acting as the data browsing apparatus 100, those skilled in the relevant art(s) understand that the functionality described herein can be implemented in a wide variety of computer systems, including a multi-purpose computer running a web browser.

Figure 1B:
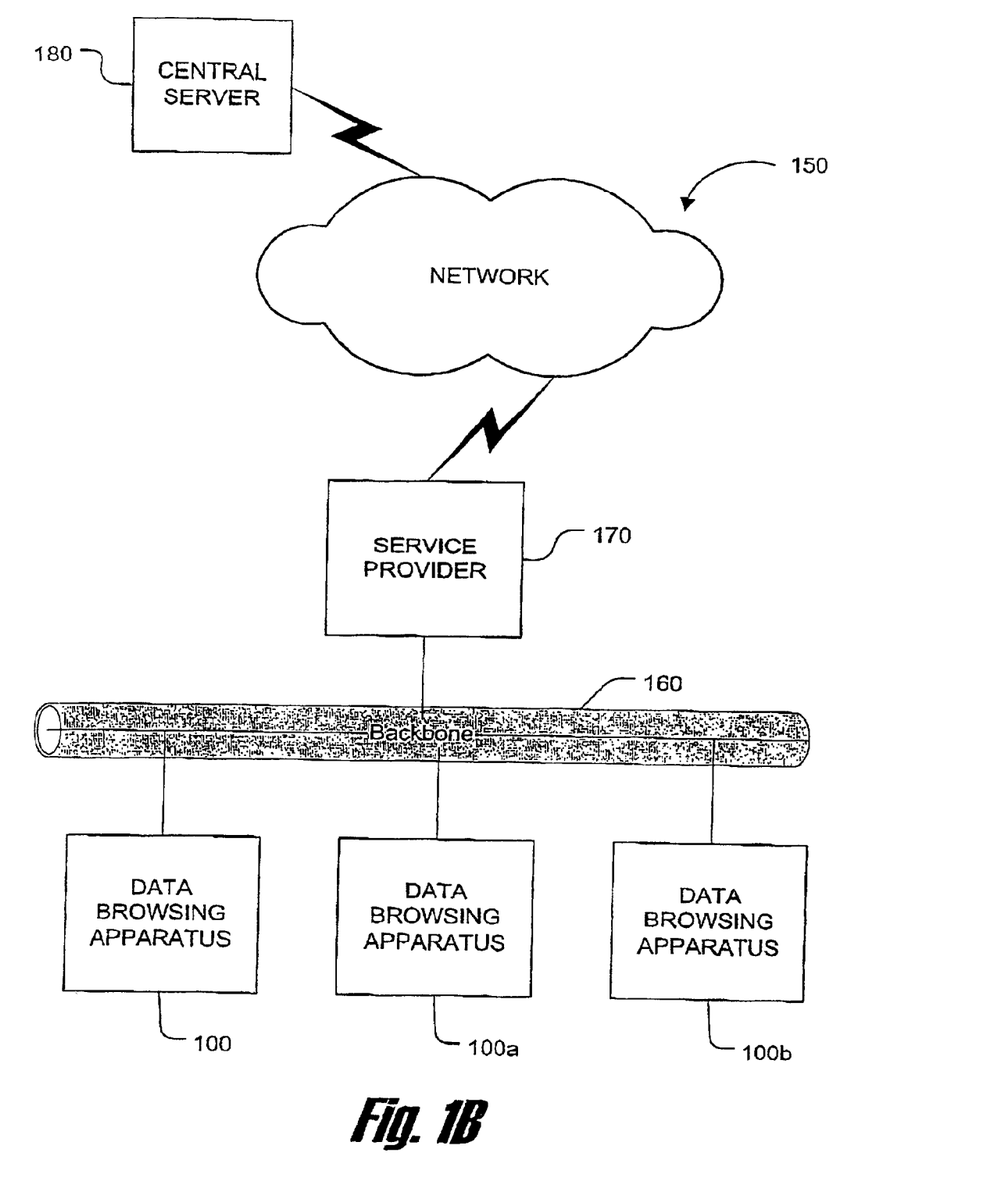
FIG. 1B is a block diagram depicting a plurality of data browsing apparatuses connected in an operational environment according to one embodiment of the present invention.

FIG. 1B is a block diagram depicting a plurality of data browsing apparatuses connected in an operational environment according to one embodiment of the present invention. Referring now to FIG. 1B, the data browsing apparatus 100 is the same as that shown in FIG. 1A. The data browsing apparatus 100 is coupled to a network backbone 160 along with a plurality of other data browsing apparatuses, such as data browsing apparatuses 100a and 100b. The network backbone 160 provides connectivity for the data browsing apparatuses 100, 100a, and 100b to a network 150 through a service provider 170. A central server 180 may also be coupled to the network 150.

For example, in one embodiment, the network 150 is the Internet, the service provider 170 is an Internet service provider (ISP), and the backbone 160 comprises a coax cable. Additionally, the central server 180 comprises a web server. In alternative embodiments, each data browsing apparatus 100, 100a, or 100b may be connected to the backbone 160 through additional layers. For example, the data browsing apparatus 100, 100a, or 100b may be connected to a local area network, such as a home network, and the local area network may then be coupled to the backbone 160.

Figure 3:
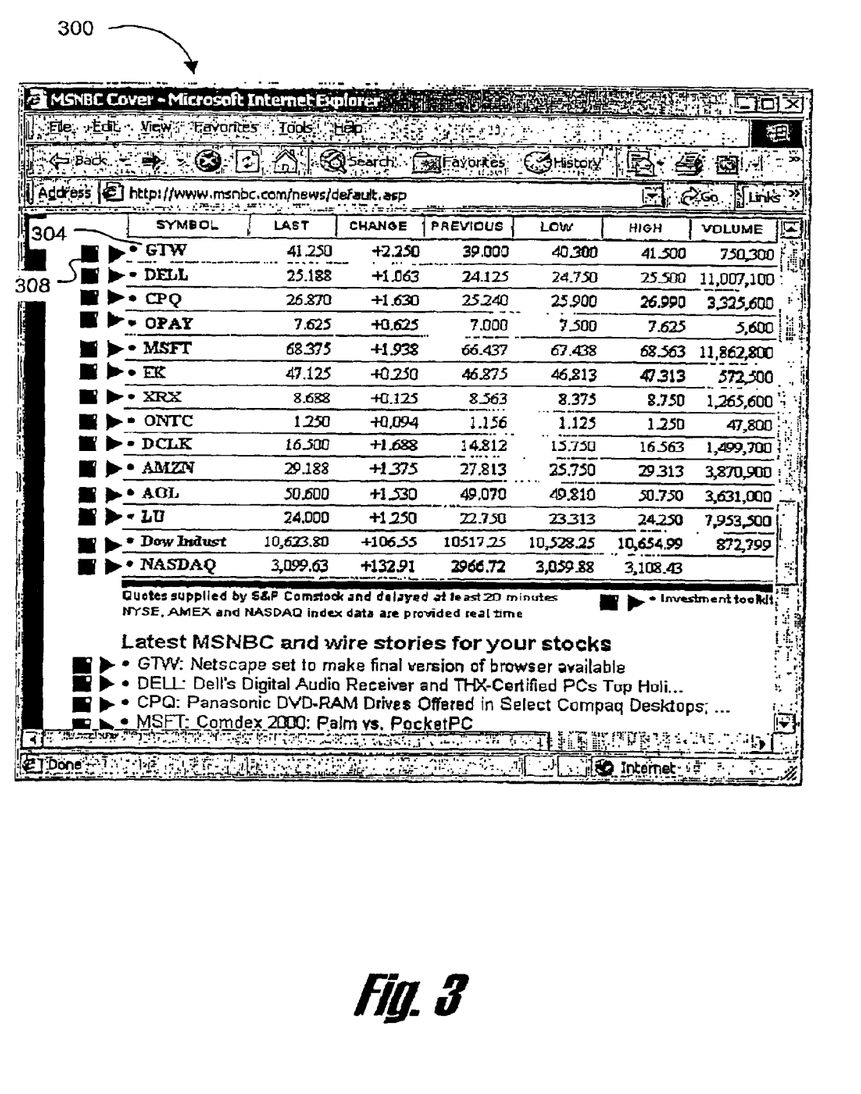
FIG. 3 is an illustration depicting an exemplary user interface for data browsing using link activation control according to one embodiment of the present invention.

FIG. 3 is an illustration depicting an exemplary user interface for data browsing using link activation control according to one embodiment of the present invention. A GUI presentation 300 is a window created by (or an instance of) data browsing software. The GUI presentation 300 is displaying the same web page, designated by the URL "http://www.msnbc.com/news/default.asp", as shown in FIG. 2. However, this web page has been modified in accordance with one embodiment of the present invention.

For each link 304 on the downloaded web page, link-option data for link activation control has been generated. In this embodiment, the link-option data comprises two additional sinks 308 for each original link 304. These additional links 308 identify the same URI as the original link 304, but further include link activation control data. This link activation control data is capable of retrieving the data identified by the URI of the original link 304 in response to selection of the additional links 308 in a particular manner independent of a manner of retrieving the data identified by the URI in response to selection of the original link 304.

For example, in one embodiment, the additional links 308 comprise a graphical square and a graphical triangle. The graphical triangle is a link that, if selected, retrieves the data specified by the URI in the current instance of the data browsing software. The graphical square is a link that, if selected, opens a new instance of the data browsing software and retrieves the data specified by the URI in the new instance. Thus, the user obtains specific control over how a link is activated without extraneous cursor movements or mouse clicks.

The square and the triangle are shown as examples only. It is understood that many alternative graphics may be used, along with alternative link activation control, as discussed more below. Depending upon the density and proximity of links on a page, automatic resizing of the alternative link graphics would be performed.

Reformatting of web pages before they appear to the end-user is well known in the art of browser and web server programming. For example, Web TV operates through servers that format web pages for best viewing on a TV screen. There are also products that remove advertisements from web pages by detecting the advertisements and reformatting the web page before it appears to the user.

In alternative embodiments, additional links are created for each original link 304, and additional link activation control functionality is enabled. The various link activation control functions that may be implemented include retrieving the linked data in the same session, retrieving the linked data in a separate session, retrieving the linked data in an editor (such as a web editor), retrieving the linked data in different data browsing software, emailing the link to a third party, saving the linked data to disk, and the like.

Figure 4:
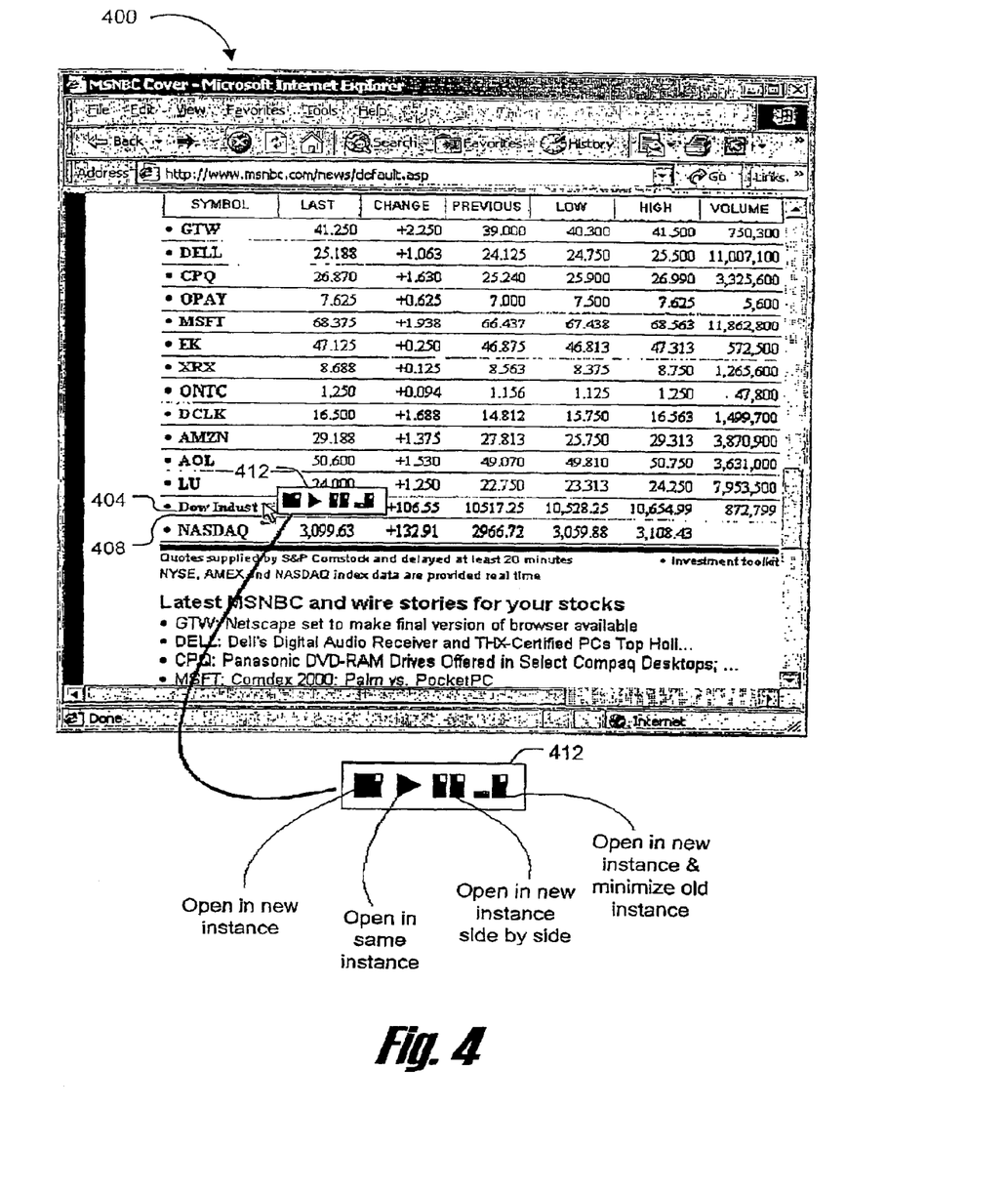
FIG. 4 is an illustration depicting an exemplary user interface for data browsing using link activation control according to another embodiment of the present invention.

FIG. 4 is an illustration depicting an exemplary user interface for data browsing using link activation control according to another embodiment of the present invention. A GUI presentation 400 is a window created by (or an instance of) data browsing software. The GUI presentation 400 is displaying the same web page, designated by the URL "http://www.msnbc.com/news/default.asp", as shown in FIGS. 2 and 3. However, this web page has been modified in accordance with another embodiment of the present invention.

For each link 404 on the downloaded web page, link-option data for link activation control has been generated. In this embodiment, the link-option data comprises code for each original link 404, which causes a pop-up menu 412 to appear when a cursor 408 remains over the original link 404 for a predetermined time. The predetermined time may be user programmable, but in one embodiment, may be one half to one second. The pop-up menu 412 includes options capable of retrieving the data identified by the URI of the original link 404 in response to selection of the pop-up menu 412 in a particular manner independent of a manner of retrieving the data identified by the URI in response to selection of the original link 404.

For example, in one embodiment, the pop-up menu 412 includes a square, a triangle, equal size bars, and unequal size bars. The square is an option that, if selected, opens a new instance of the data browsing software and retrieves the data specified by the URI in the new instance. The triangle is an option that, if selected, retrieves the data specified by the URI in the current instance of the data browsing software. The equal size bars is an option that, if selected, opens a new instance of the data browsing software, resizes the old and the new instances of the data browsing software so that they appear side-by-side with each other, and retrieves the data specified by the URI in the new instance. The unequal size bars is an option that, if selected, opens a new instance of the data browsing software, minimizes the old instance, and retrieves the data specified by the URI in the new instance.

The square, triangle, equal size bars, and unequal size bars are shown as examples only. It is understood that many alternative graphics may be used, along with alternative lick activation control, as discussed more below. Additionally, the equal size bars and unequal size bars options need not create new instances or windows. For example, in one embodiment, the equal size bars option may be implemented using HTML frames, such that the current web page is reformatted to display the data identified by the current URI in one frame and the data identified by the selected URI in another frame.

Moreover, the link-option code is not limited to code that generates the pop-up window 412. For example, in one embodiment, the link-option code may use speech recognition technology to activate links. Each link on the web page may be identified and given a number. The web page may then be modified to add the number of each link next to the link. The user may then activate each link using commands like "open link 3", "branch link 4", and "side by side link 2", to retrieve the URI data of the third link in the current window, retrieve the URI data of the fourth link in a new window, and retrieve the URI data of the second link in a new window side-by-side with the current window, respectively.

Figure 5:
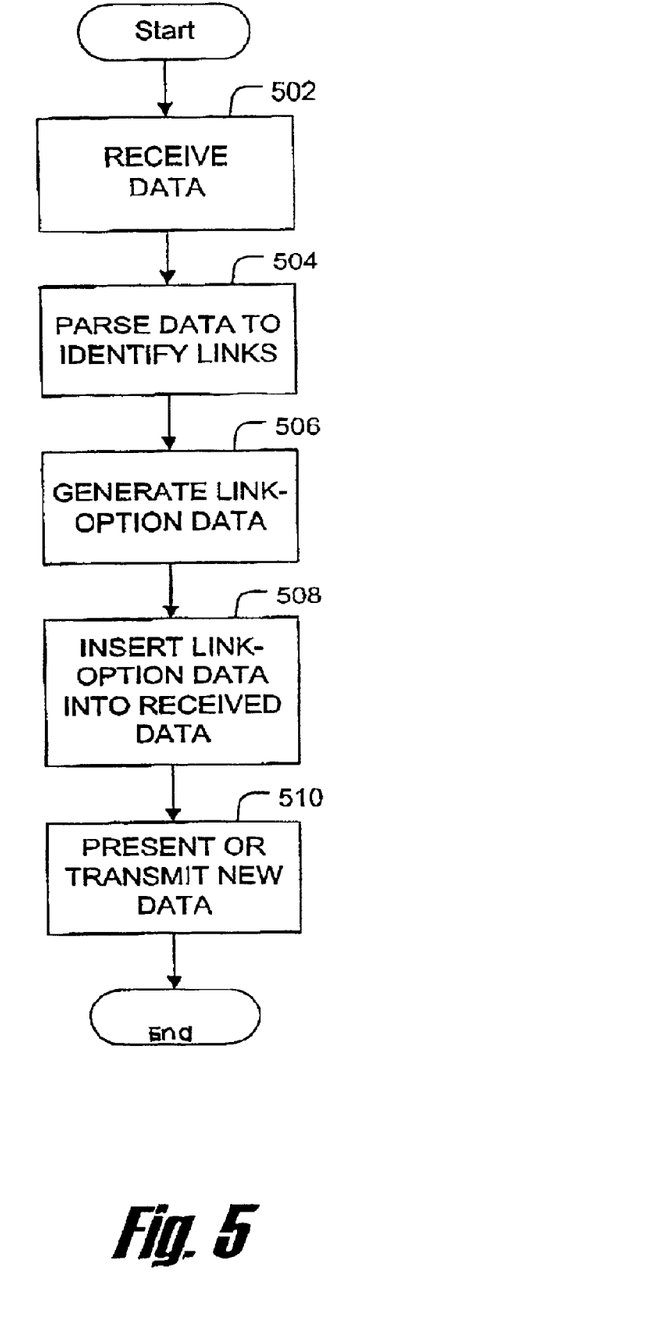
FIG. 5 is a flowchart depicting a method for providing specific link activation control in a data browsing apparatus according to one embodiment of the present invention.

FIG. 5 is a flowchart depicting a method for providing specific link activation control in a data browsing apparatus according to one embodiment of the present invention. In step 502, data is received. This data includes at least one link to information. For example, in one embodiment, a user selects a link to another web page, which causes a web browser to request the data identified by the link. The received data includes the link to the requested web page.

In step 502, the data may be received by different portions of the data browsing environment in different embodiments. For example, in one embodiment, the data may be received in a web browsing apparatus 100, such as that shown in FIG. 1A. In this embodiment, the method may be implemented in either the user interface 116 or the network interface 108. For example, the method may be implemented as a browser plug-in for installation in a web browser. In an alternative embodiment, the data may be received at a service provider 170, such as that shown in FIG. 1B. In this embodiment, the method may be implemented in at least one computer making up the service provider 170. In another alternative embodiment, the method may be implemented on a central server 180, which is a web server. A user may first request a web page from the web server 180, and then perform data browsing. All web page requests may be routed through the web server 180, which in turn may implement the method depicted in FIG. 5.

Referring once again to FIG. 5, the received data is parsed in step 504 to identify the links to information. The data may be parsed in accordance with methods well-known to those skilled in the art. For example, in a web embodiment, step 504 involves parsing the HTML text to identify links, such as by looking for an "href" attribute of an "a" element. It should be appreciated that many different types of links may be identified in step 504, even within one embodiment, such as an XML link or the like.

Next, in step 506, link-option data is generated. As discussed above, the link-option data may be one or more additional links, code for performing specific link activation control functions, or a combination of links and code. The link-option data is generated by first isolating the part of the identified link that is a reference to information, and then this part of the link is copied and added to a wrapper of data for implementing a specific type of link activation. For example, in a web embodiment, the link-option data is generated by first isolating the URI. This URI is then associated with a wrapper of data which includes an href identifying a graphic for the link, such as the triangle graphic discussed above, and an href to be associated with the MRI. In this fashion, a new link is created to the same URI as the URI isolated from the identified link, wherein the new link has specific functionality that is preferably readily ascertainable from its manner of presentation to a user.

Once the link-option data is generated in step 506, this link-option data is inserted into the received data in step 508. In one embodiment, the link-option data comprises a new link with an associated graphic, and it is inserted such that it appears in close proximity to the link identified in step 504.

Then in step 510, the newly created data is either presented to the user or transmitted to the user, depending on the particular embodiment. For example, in an embodiment such as that shown in FIG. 1A, where the method of FIG. 5 is implemented in the data browsing apparatus 100, the newly created data is presented to the user. Alternatively, in an embodiment such as that shown in FIG. 1B, where the method of FIG. 5 is implemented at the central server 180, the newly created data is transmitted to the user.

Although the flowchart of FIG. 5 is discussed in terms of distinct sequential steps, it is understood that these steps may overlap. For example, in one embodiment, as data is received in step 502, it may be simultaneously parsed in step 504. As each link is identified in step 504, link-option data may be generated in step 506 and inserted into the received data at step 508, even as the data is continued to be received in step 502.

Moreover, although the method depicted in the flowchart of FIG. 5 is shown having a start and an end, it should be appreciated by those skilled in the relevant art(s) that the method is actually part of a larger method for data browsing or network communication, which need not be described in detail herein. Additionally, the method steps of FIG. 5 may be cycled through any number of times.

Figure 6:
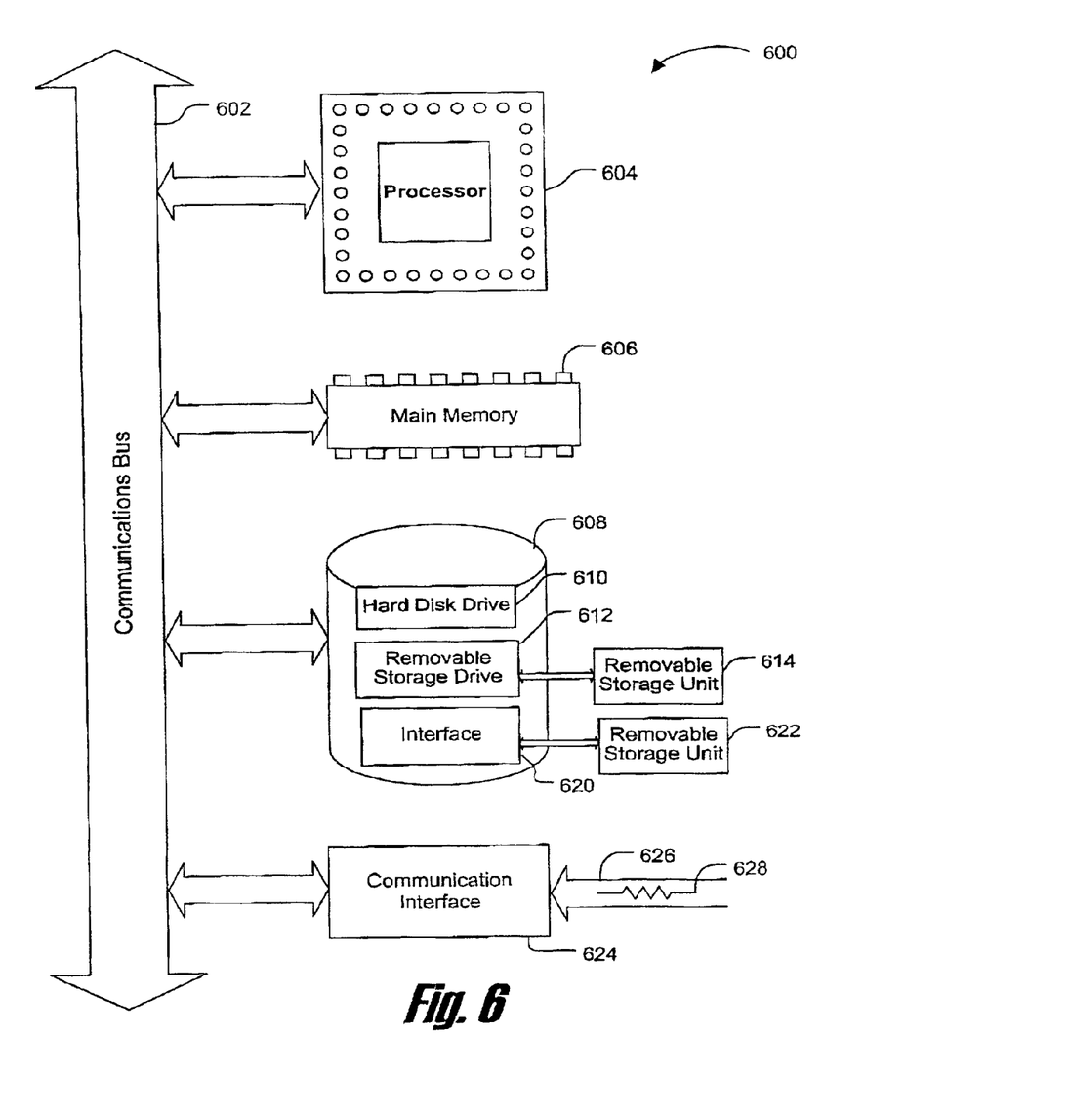
FIG. 6 is a block diagram illustrating an example system in which elements and functionality of the invention are implemented according to one embodiment of the present invention.

FIG. 6 is a block diagram illustrating an example computer system in which elements and functionality of the invention are implemented according to one embodiment. The present invention may be implemented using hardware, software or a combination thereof and may be implemented in a computer system or other processing system. An exemplary computer system 600 is shown in FIG. 6. Various software embodiments are described in terms of this exemplary computer system 600. After reading this description, it will become apparent to a person having ordinary skill in the relevant art(s) how to implement the invention using other computer systems and/or computer architectures.

Referring now to FIG. 6, the computer system 600 includes one or more processors, such as processor 604. Additional processors may be provided, such as an auxiliary processor to manage input/output, an auxiliary processor to perform floating point mathematical operations, a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor. It will be recognized that such auxiliary processors may be discrete processors or may be built in to the processor 604.

The processor 604 is connected to a communication bus 602. The communication bus 602 may include a data channel for facilitating information transfer between storage and other peripheral components of the computer system 600. The communication bus 602 further provides the set of signals required for communication with the processor 604, including a data bus, address bus, and control bus (not shown). The communication bus 602 may comprise any known bus architecture according to promulgated standards, for example, industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and the like.

Computer system 600 includes a main memory 606 and may also include a secondary memory 608. The main memory 606 provides storage of instructions and data for programs executing on the processor 604. The main memory 606 is typically semiconductor-based memory such as dynamic random access memory (DRAM) and/or static random access memory (SRAM). Other semiconductor-based memory types include, for example, synchronous dynamic random access memory (SDRAM), Rambus dynamic random access memory (RDRAM), and ferroelectric random access memory (FRAM). In one embodiment of the computer system 600, the main memory 606 may be a combination of a RAM and a read only memory (ROM), and the secondary memory 608 may not be present.

The secondary memory 608 may include, for example, a hard disk drive 610 and/or a removable storage drive 612, representing a floppy disk drive, a magnetic tape drive, an optical disk drive, and the like. The removable storage drive 612 reads from and/or writes to a removable storage unit 614 in a well-known manner. Removable storage unit 614 may be a floppy disk, magnetic tape, optical disk, and the like, which is read by and/or written to by removable storage drive 612. As will be appreciated by those skilled in the art, the removable storage unit 614 includes a computer usable storage medium having stored therein computer software and/or data.

In alternative embodiments, secondary memory 608 may include other similar means for allowing computer programs or other instructions to be loaded into the computer system 600. Such means may include, for example, a removable storage unit 622 and an interface 620. Examples of such means include semiconductor-based memory such as programmable read-only memory (PROM), erasable programmable read-only memory (EPROM), electrically erasable read-only memory (EEPROM), or flash memory (block oriented memory similar to EEPROM). Also included are any other removable storage units 622 and interfaces 620, which allow software and data to be transferred from the removable storage unit 622 to the computer system 600.

The computer system 600 also includes a communications interface 624. The communications interface 624 allows software and data to be transferred between the computer system 600 and external devices, networks or information sources. Examples of the communications interface 624 include a modem, a network interface (such as an Ethernet card), a communications port, a PCMCIA slot and card, and the like. The communications interface 624 preferably implements industry promulgated architecture standards, such as Ethernet IEEE 802 standards, Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), Data Over Cable Service Interface Specification (DOCSIS), and the like.

Software and data transferred via the communications interface 624 are in the form of signals 628, which can be electronic, electromagnetic, optical or other signals capable of being received by communications interface 624. These signals 628 are provided to the communications interface 624 via a channel 626. This channel 626 carries the signals 628 and may be implemented using wire or cable, fiber optics, a phone line, a cellular phone link, a radio frequency (RF) link, infrared interface (IR) or other communications channels.

Computer programming instructions (also known as computer programs, software or code) are stored in the main memory 606 and/or the secondary memory 608. Computer programs may also be received via the communications interface 624. Such computer programs, when executed, enable the computer system 600 to perform the features of the present invention as discussed herein. In particular, the computer programs, when executed, enable the processor 604 to perform the features and functions of the present invention. Accordingly, such computer programs represent controllers of the computer system 600.

In one embodiment, the communications bus 602 is coupled with a display (not shown), such as a cathode ray tube (CRT), for displaying information to a computer user. Various input devices may also be coupled with the communications bus 602 for communicating information and command selections to the processor 604. These input devices may include a keyboard (not shown), a cursor control device (such as a mouse, trackball, or cursor direction keys) (not shown), and a microphone (not shown) for voice command inputs.

In an embodiment where the invention is implemented using software, the software may be stored in a computer readable medium and loaded into the computer system 600 using the hard drive 610, the removable storage drive 612, the interface 620, the or communications interface 624. Examples of computer readable media include removable storage units 614 and 622, a hard disk installed in the hard disk drive 610, a ROM installed in the computer system 600, and the signals 628. The software, when executed by the processor 604, causes the processor 604 to perform the features and functions of the invention as described herein.

In another embodiment, the invention is implemented primarily in hardware using, for example, hardware components such as application specific integrated circuits ("ASICs"). Implementation of the hardware state machine so as to perform the functions described herein will be apparent to persons having ordinary skill in the relevant art(s).

In yet another embodiment, the invention is implemented using a combination of both hardware and software. It should be appreciated that modification or reconfiguration of the computer system 600 of FIG. 6 by one having ordinary skill in the relevant art(s) will not depart from the scope or the spirit of the present invention.

What is claimed is:

1. A computer implemented method for link-level control of browser presentations, comprising the steps of:
   receiving data, wherein the data includes a selectable link to information;
   parsing the received data to identify the link;
   generating selectable link-option data, wherein the link-option data retrieves the information in response to selection of the link-option data independently of retrieving the information in response to selection of the link;

inserting the link-option data into the received data before presenting the received data to a user; and reformatting and displaying the received data with the link-option data incorporated therein to produce a display of both the link and link-option data wherein a visible presentation of an additional link-option corresponding to the link-option data is provided to a user and thus by selection of the additional link-option, the user can retrieve the information independently of retrieving the information in response to selection of the link.

2. The computer-implemented method of claim 1, wherein the link-option data is selectable by a cursor control device.

3. The computer-implemented method of claim 1, wherein a plurality of links are displayed, wherein the links are provided with a simple identifier, and the link-option data is selectable by voice input using the corresponding identifier.

4. The computer-implemented method of claim 3, wherein the identifiers are numbers.

5. The computer-implemented method of claim 1, wherein said link-option data represents a plurality of different additional links.

6. The computer-implemented method of claim 1, wherein the link-option data comprises at least one of a first additional link for retrieving the information for display in a current presentation instance, a second additional link for retrieving the information for display in a separate presentation instance overlaid upon the current presentation instance, a third additional link for retrieving the information for display in a separate presentation instance side-by-side with the current presentation instance, and a fourth additional link for retrieving the information for display in a separate presentation instance and minimizing the current presentation instance.

7. The computer-implemented method of claim 1, wherein the link-option data comprises at least one additional link to the information for carrying out at least one of: retrieving the information for editing in an editor program, sending the link to another user, and retrieving the information for storage on a data storage device.

8. A computer readable medium having stored thereon one or more sequences of instructions for causing one or more processors to perform a method for link-level control of browser presentations, the method comprising the steps of:

receiving data, wherein the data includes a selectable link to information;

parsing the received data to identify the link;

generating selectable link-option data, wherein the link-option data is retrieves the information in response to selection of the link-option data independently of retrieving the information in response to selection of the link;

inserting the link-option data into the received data before presenting the received data to a user;

reformatting and displaying the received data with the link-option data incorporated therein to produce a display of both the link and link-option data wherein a visible presentation of an additional link-option corresponding to the link-option data is provided to a user and thus by selection of the additional link-option, the user can retrieve the information independently of retrieving the information in response to selection of the link.

9. The computer readable medium of claim 8, wherein the link-option data comprises at least one of: a first additional link for retrieving the information for display in a current presentation instance, a second additional link for retrieving the information for display in a separate presentation instance overlaid upon the current presentation instance, a third additional link for retrieving the information for display in a separate presentation instance side-by-side with the current presentation instance, and a fourth additional link for retrieving the information for display in a separate presentation instance and minimizing the current presentation instance.

10. The computer readable medium of claim 8, wherein the link-option data comprises at least one additional link to the information for carrying out at least one of:

retrieving the information for editing in an editor program, sending the link to another user, and retrieving the information for storage on a data storage device.

11. The computer readable medium of claim 8, wherein the one or more sequences of instructions are configured for installation in an existing browser on a data browsing apparatus.

12. A system for link-level control of browser presentations, comprising means for receiving data, wherein the data includes a selectable link to information;

means for parsing the received data to identify the link;

means for generating selectable link-option data, wherein the link-option data retrieves the information in response to selection of the link-option data independent of retrieving the information in response to selection of the link;

means for inserting the link-option data into the received data before presenting the received data to a user; and means for reformatting and displaying the received data with the link-option data incorporated therein to produce a display of both the link and link-option data wherein a visible presentation of an additional link-option corresponding to the link-option data is provided to a user and thus by selection of the additional link-option, the user can retrieve the information independently of retrieving the information in response to selection of the link.

13. A data browsing apparatus, comprising:

a processor;

a memory coupled to the processor;

a network interface coupled to the processor; and logic capable of being executed by the processor for receiving data via the network interface wherein the data includes a selectable link to information, parsing the received data to identify the link, generating selectable link-option data wherein the link-option data retrieves the information in response to selection of the link-option data independent of retrieving the information in response to selection of the link, inserting the link-option data into the received data, and reformatting and displaying the received data with the link-option data incorporated therein to produce a display of both the link and link-option data wherein a visible presentation of an additional link-option corresponding to the link-option data is provided to a user and thus by selection of the additional link-option, the user can retrieve the information independently of retrieving the information in response to selection of the link.

14. The data browsing apparatus of claim 13, wherein the logic is implemented as a user interface program stored on the memory.

15. The data browsing apparatus of claim 13, wherein the logic is implemented by the network interface.

16. The data browsing apparatus of claim 13, wherein the link-option data comprises at least one of: a first additional link for retrieving the information for display in a current presentation instance, a second additional link for retrieving the information for display in a separate presentation instance overlaid upon the current presentation instance, a third additional link for retrieving the information for display in a separate presentation instance side-by-side with the current presentation instance, and a fourth additional link for retrieving the information for display in a separate presentation instance and minimizing the current presentation instance.

17. The data browsing apparatus of claim 13, wherein the link-option data comprises at least one additional link to the information for carrying out at least one of: retrieving the information for editing in an editor program, sending the link to another user, and retrieving the information for storage on a data storage device.

* * * * *